March 7, 1944.  J. W. BRUNDAGE  2,343,641
VULCANIZER
Filed Aug. 25, 1939  4 Sheets-Sheet 1

INVENTOR.
JAMES W. BRUNDAGE.
BY Oberlin, Limbach + Day
ATTORNEYS

March 7, 1944.　　　J. W. BRUNDAGE　　　2,343,641
VULCANIZER
Filed Aug. 25, 1939　　　4 Sheets-Sheet 2
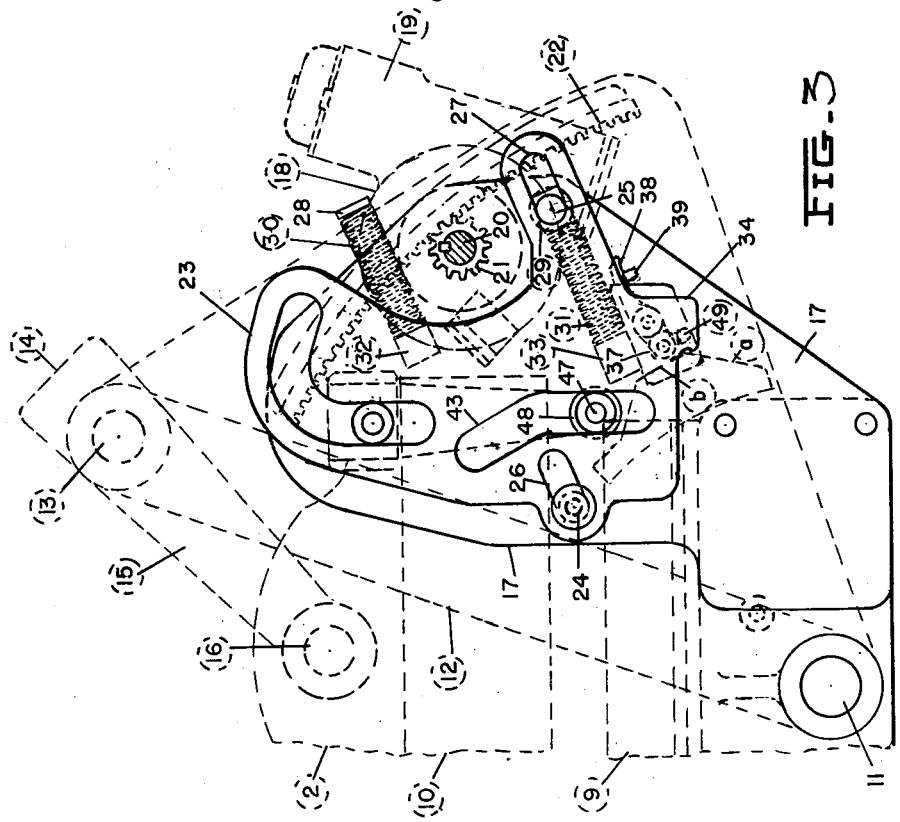
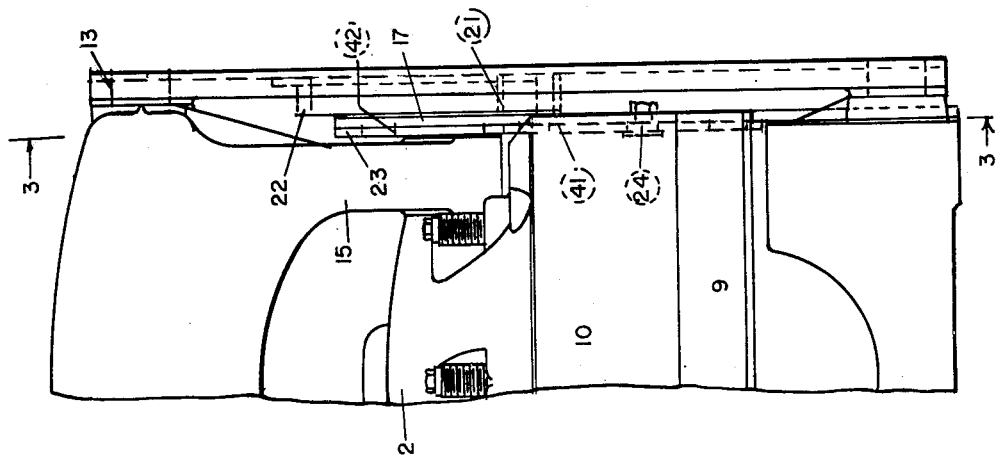
INVENTOR.
JAMES W. BRUNDAGE
BY Oberlin, Limbach & Day
ATTORNEYS.

March 7, 1944.  J. W. BRUNDAGE  2,343,641
VULCANIZER
Filed Aug. 25, 1939  4 Sheets-Sheet 3

INVENTOR.
JAMES W. BRUNDAGE
BY Oberlin, Limbach + Day
ATTORNEYS.

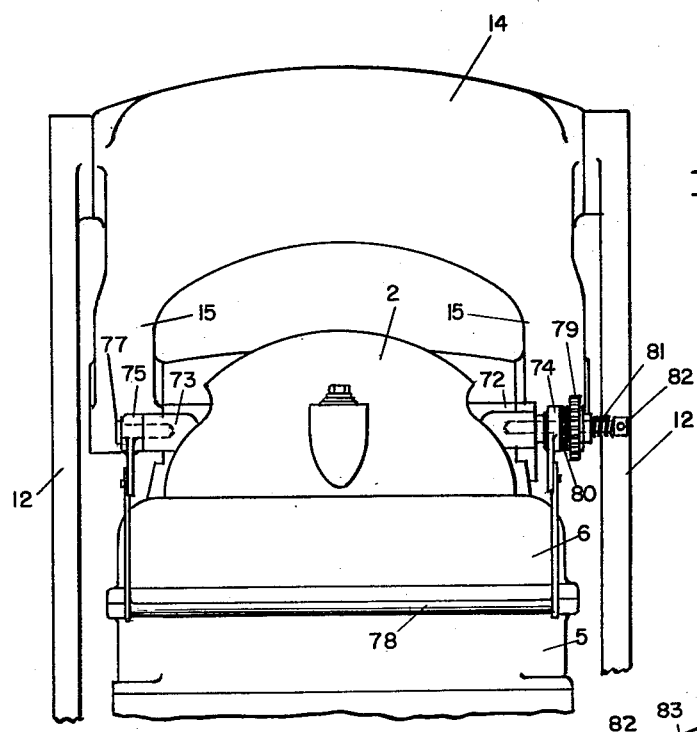

Patented Mar. 7, 1944

2,343,641

UNITED STATES PATENT OFFICE 2,343,641

VULCANIZER

James W. Brundage, Akron, Ohio, assignor, by mesne assignments, to The McNeil Machine and Engineering Company, Akron, Ohio, a corporation of Ohio Application August 25, 1939, Serial No. 291,914

10 Claims. (Cl. 18—17)

This invention relates, as indicated, to vulcanizers, and more particularly to unit-type machines comprising a pair of press heads adapted to carry the complementary mold sections which when brought together define the curing chamber therebetween.

It is a principal object of my invention to provide an apparatus of the character described which is noteworthy for its simplicity of construction and operation and which can thus be economically constructed and maintained.

A further object of my invention is to provide a mechanism particularly adapted for the curing of automobile tire casings and which, due to the manner of its construction and operation, insures a separation of the cured article from the mold elements as the press is opened at the end of the curing period.

A further and more particular object of my invention is to provide improved means for supporting and controlling the movement of that press head to which the principal movement is effected in opening and closing the press.

Other objects of my invention will appear as the description proceeds.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 2 is a fragmentary front elevational view of the construction illustrated in Fig. 1;

Fig. 3 is a sectional view of the construction as illustrated in Fig. 2 taken on a plane substantially indicated by the line 3—3;

Fig. 6 is a front elevational view of a portion of a press similar to that illustrated in Fig. 1 but showing incorporated therein an auxiliary stripping device forming a part of my invention;

Fig. 7 is a side elevational view of the structure as illustrated in Fig. 6; and Fig. 8 is a plan view of such structure.

Figure 1:
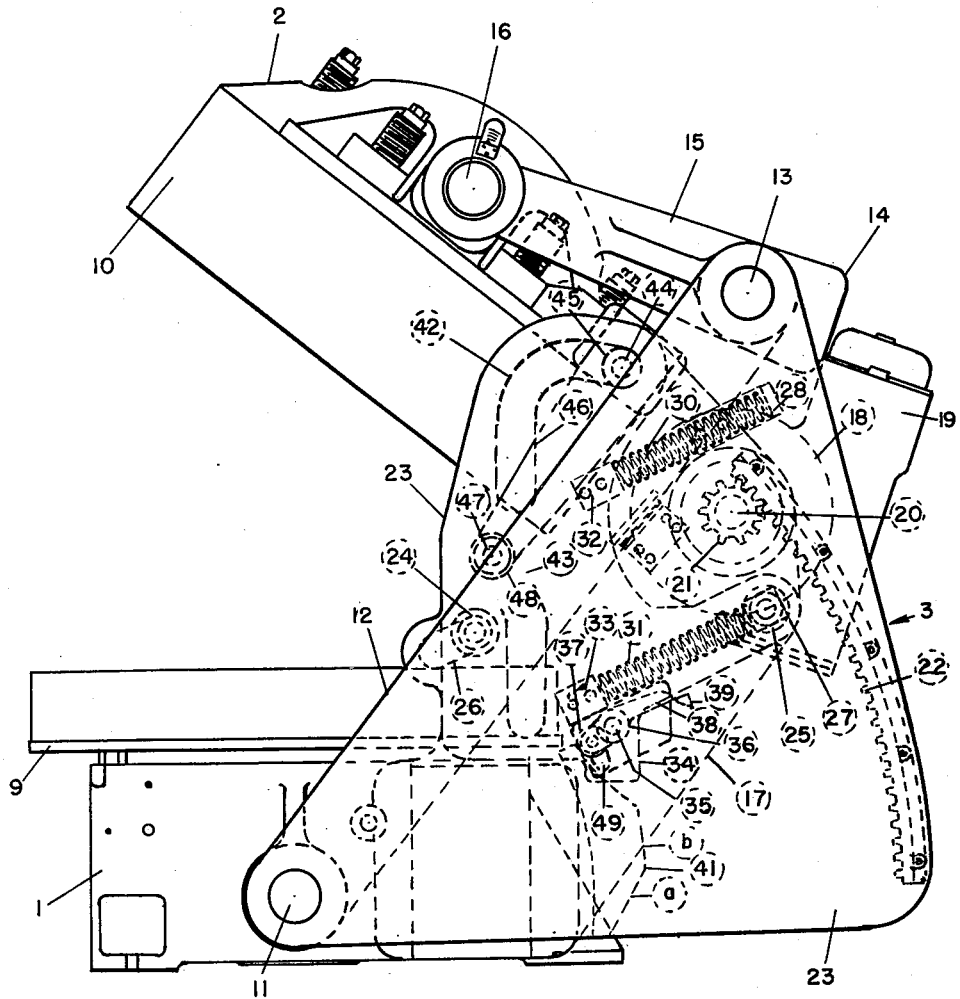
Fig. 1 is a side elevational view of a vulcanizer constructed in accordance with the principles of my invention.

Referring now more specifically to the drawings and more especially to Figs. 1, 2 and 3, the press here illustrated as one embodiment of my invention comprises a base generally indicated at 1, a movable head 2 and supporting and actuating mechanism generally indicated at 3, for the purpose of moving the upper head 2 relatively to the lower head.

Figure 4:
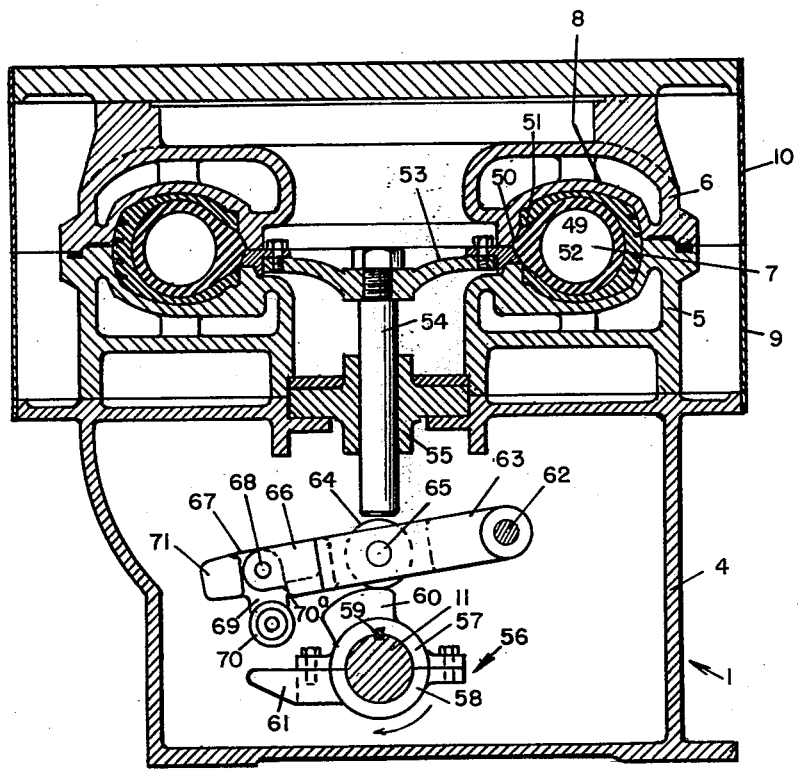
Fig. 4 is a sectional view of the lower portion of the press as illustrated in Fig. 1, showing in detail the arrangement of the mold elements and the improved article stripping device forming a part of my invention.

The base 1 comprises, as perhaps most clearly illustrated in Fig. 4, a supporting frame 4 which may be of a casting or fabricated from structural steel shapes. Supported on the base is a steam chambered lower mold element 5 having a matrix face on its upper surface which cooperates with the steam chambered upper mold element 6 carried by the upper head 2 in defining a mold cavity 7 therebetween and wherein the work, such as an automobile tire casing 8, may be cured. Shields 9 and 10 are respectively provided around the lower and upper mold elements for the purposes well known in the art.

Journalled in suitable bearings provided therefor in the base 1 is a shaft 11 which on its opposite ends has side arms 12 secured thereto. The upper ends of the side arms 12 are engaged by the trunnions 13 of the head link member 14 which at its forward end is provided with spaced arms 15 pivotally secured at 16 to the upper press head 2. A pair of upwardly extending side plates 17 are respectively secured to opposite sides of the base 1. A tubular driving housing 18 is secured between the side plates 17 at their upper rear extremities such housing containing therein and supporting a driving motor generally indicated at 19 and a drive shaft 20. The motor and drive shaft are interconnected by a suitable train of speed reducing gears whereby energization of the motor 19 results in a driving of the shaft 20 in either direction as selected. Mounted on opposite ends of the drive shaft 20 are pinions 21 which mesh with a rack 22. The rack 22 is arcuate in form with its center at the axis of the shaft 11. The rack 22 is secured to a plate 23' carried by the side arms 12. It will thus be observed that when the shaft 20 is energized for rotation of the pinions 21 such pinions meshing with the rack 22 cause the plates 23' and the side arms 12 to which they are connected to be rotated about the axis of the shaft 11. The construction of this supporting mechanism as thus far described is more particularly disclosed and claimed in my co-pending application Serial No. 245,726, filed December 14, 1938. In view of the detailed disclosure of the construction of the actuating means for the side arms 12 in said earlier application and since such details form no part of the present invention, it is believed unnecessary to more particularly illustrate or describe the same in this case.

Mounted inwardly of the side plates 17 are auxiliary plates 23 which in the present construction perform substantially the same function as the auxiliary side plates 4' in the construction illustrated in my aforesaid prior application.

The auxiliary side plates 23 are hung on the main side plates 17 by means of stub shafts 24 and 25 carried by the main side plates 17 and provided with rollers which operate in slots 26 and 27, respectively, formed in the auxiliary side plates 23. Mounted on the main side plates 17 are brackets 28 and 29 which serve as abutments for the springs 30 and 31, respectively. The opposite ends of such springs bear against brackets 32 and 33, respectively, which are secured to the auxiliary side plate 23. The springs 30 and 31 are normally under compression and thus tend to move the auxiliary side plate 23, as viewed in Fig. 3, to the left so that the rollers on the shafts 24 and 25 bear against the right hand ends of the slots 26 and 27.

The main side plates 17 are provided with openings 34 and in the area opposite such openings, as most clearly illustrated in Figs. 1 and 3, the auxiliary plates 23 on opposite sides of the machine have a shaft 35 journalled therein which extends across the back of the machine. On opposite ends of such shafts and adjacent the inner face of the plates 23' there are mounted arms 36. The forwardly extending portion of such arms 36 carry a roller 37 and the rearwardly extending portions of such arms comprise fingers 38. The outer face of the main side plates 17 carry abutments 39 and 40.

A cam member 41 of the shape as clearly illustrated in Figs. 1 and 3 is mounted on the inner face of each of the plates 23'.

Each of the auxiliary plates 23 is provided with cam slots 42 and 43 respectively. The upper head 2 carries stub shafts 44 on opposite sides thereof, which stub shafts extend into the cam slots 42. Rollers 45 are mounted on the stub shafts 44 and operate in the cam slots 42.

Projecting downwardly from the rear of the upper head 2, at opposite sides thereof, are arms 46, the lower ends of which carry stub shafts 47 which extend into the cam slots 43. Rollers 48 are mounted on the stub shafts 47 and guide such stub shafts in their associated cam slots.

The operation of the above-described elements of the construction will be explained in greater detail in connection with the general description of the operation of the apparatus.

The vulcanizer of my invention is particularly applicable for the vulcanization of automobile tire casings which are internally supported during the curing period by means of a curing bag 49, as most clearly illustrated in Fig. 4. These curing bags are so constructed that they extend inwardly as at 50, radially inwardly of the bead 51 of the tire casing.

In the preferred embodiment of my invention a stripper ring 52 is provided which actually forms a part of the lower mold element 5, although separable therefrom. As illustrated in Fig. 4, this stripper ring extends into the mold cavity for a distance just sufficient to engage the curing bag 49 in its inwardly extending area 50 but not sufficient to engage the bead 51 of the tire casing.

The stripper ring 52 is mounted on a spider 53 which is carried by a vertical shaft 54 slidably supported in a bearing 55 centrally of the lower mold element 5.

The shaft 11 has secured thereto in an area centrally of the press a cam member generally indicated at 56 and which for convenience consists of two sections 57 and 58 respectively, which may be clamped together as by bolting around the shaft 11 and secured against rotation thereon by means of a key such as 59. The section 57 carries a circular cam member 60 and the section 58 carries a finger such as 61.

Figure 5:
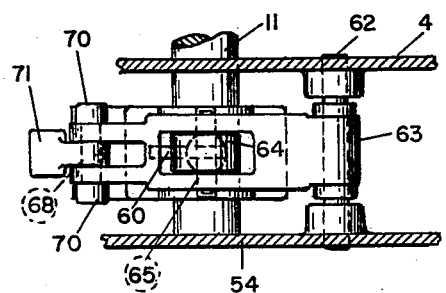
Fig. 5 is a plan view of the apparatus shown in the lower portion of Fig. 4, i. e., the actuating mechanism for the stripper.

The base 1 also supports a shaft 62, the axis of which is substantially parallel to the axis of the shaft 11. As most clearly illustrated in Fig. 5, an arm 63 is pivotally mounted on the shaft 62. The arm 63 carries a roller 64 on a shaft 65, such roller arranged to engage the lower end of the vertical shaft 54. The bifurcated terminal 66 of the arm 63 rotatably supports an angle shaped member 67 on a pin 68. The depending arm 69 of the member 67 carries a roller 70 and the other arm 71 acts as a counterweight.

Now referring to Figs. 6, 7 and 8, it will be noted that the upper head 2 is provided with bosses 72 and 73 on opposite sides thereof. Arms 74 and 75 are rotatably mounted on stub shafts 76 and 77 respectively carried by the bosses 72 and 73. The forward ends of the arms 74 and 75 are interconnected by means of a stripper bar 78.

Rotatably supported on the stub shaft 76 is a pinion 79. Friction material 80, such as the fibrous material used in brake bands, is interposed between the pinion 79 and the hub of the arm 74. A spring 81 mounted on the stub shaft 76 and retained thereon by the collar 82, resiliently urges the pinion 79 into engagement with the friction material 80. To the arm 15 of the head link member which is adjacent the pinion 79, there is secured a gear segment 83 which meshes with the pinion 79. It will be observed that the arm 78 is of such proportions that when the press is closed, as illustrated in Fig. 7, the cross bar of the stripper arm 78 rests against the lower mold section 5 adjacent the parting line between the molds.

The operation of the above-described form of construction which comprises a preferred embodiment of my invention may be described as follows:

When the press is in the opened position, as illustrated in Fig. 1, a tire to be cured may be placed therein, the press closed by energizing the motor and counterclockwise rotation of the pinion 21, which will result in bringing the mold elements 5 and 6 into closed relation to define the curing chamber therebetween. At the end of the curing cycle the motor 19 will be energized as by conventional automatic control mechanism to drive the pinion 21 in clockwise direction to open the press. Moving the pinion 21 in a clockwise direction will result in a clockwise movement of the plates 23' carrying the racks 22 and since such plates are connected to the side arms 12 the latter will likewise be rotated in a clockwise direction with a similar rotation of the shaft 11. As the plates 23' rotate in a clockwise direction, the inclined face a of the cam 41 will engage the roller 37 carried by the arm 36. The arm 36 is prevented from rotating in a counterclockwise direction by virtue of the fact that it is prevented from doing so by the stop 40. Since the arms 36 are mounted on the shaft 35 which is secured in the auxiliary side plates, the latter will be moved to the right by the inclined surface *a* of the cam 41, this movement being permitted by the slots 26 and 27 in which the supporting stub shafts 24 and 25 carried by the plates 17 are mounted. This movement to the right of the auxiliary side plates will continue until the roller 37 moves onto the portion *b* of the cam 41. The position of the parts is then as illustrated in Fig. 3 of the drawings. The initial separating movement of the mold sections is therefore an actual separation between their mating faces concurrent with a lateral shifting therebetween so that the tire casing is gripped by the forward edge of the upper mold section 6 and by the rear edge of the lower mold section 5. With the tire thus gripped the mold sections separate with their faces substantially parallel until the stub shafts 44 and 47, or more particularly the rollers 45 and 48 carried thereby, reach the upper end of the vertical components of the cam slots 42 and 43 respectively. Further clockwise rotation of the side arms 12 and their associated plates 23' results in a further separation of the mold sections and a tipping of the upper mold section into the position illustrated in Fig. 1. After the press has moved to the fully opened position, the respective parts thereof occupy the various positions shown in Fig. 1.

Concurrently with the initial opening movement of the press which, as previously indicated, includes a clockwise rotation of the shaft 11, the finger 61 carried by such shaft is likewise rotated so that it strikes the roller 70 and continued rotation of the shaft 11 therefore causes a clockwise rotation of the arm 63 about the axis of its pivotal support 62. Such rotation of the arm 63 raises the vertical shaft 54, elevating the stripper ring 52 off from its seat on the lower mold element 5.

Separating movement of the mold elements, gripping the tire in the manner previously illustrated, tends to strip the tire from both mold sections. The stripper ring 52, being elevated in the manner described, further facilitates this stripping action, particularly in stripping the tire from the lower mold section 5 to which it usually adheres to the greatest extent. After the shaft 11 has rotated for a distance sufficient to bring the upper mold element 6 a substantial distance above the lower mold section 5, the end of the finger 61 will clear the roller 70, permitting the arm 63, and consequently the vertical shaft 54, to drop so that the stripper ring 52 immediately returns to its seat on the lower mold element 5. When the shaft 11 rotates in a counterclockwise direction during the closing movement of the press, the finger 61 strikes the right hand side of the roller 70, this, however, merely resulting in a rotation of the angle shaped member 67 about the axis of its pivotal support 68. Thus the arm 63 is not elevated during the closing movement of the press, complementary shoulders 70a on the arm 63 and the element 69 preventing the counterclockwise rotation of the arm 69 with respect to the arm 63 during the opening movement of the press.

The roller 64, cooperating with the circular cam element 60, maintains the arm 63 in proper position during the interval when the arm is not being acted upon by the finger 61.

Likewise, during the early stages of opening movement of the press the arms 15 of the link 14 are rotated relatively to the upper head 2. Such rotation results in a clockwise rotation of the gear segment 83, as illustrated in Fig. 7, and a counterclockwise rotation of the pinion 79. This counterclockwise rotation of the pinion 79 tends to similarly rotate the stripper bar 78 about the axes of the stub shafts 76 and 77. To the extent that such counterclockwise rotation of the stripper bar is opposed by its striking an element of the press, the pinion 79 is permitted to rotate relatively to the arm 74 by virtue of the friction facing 80. Just as soon as the press elements separate for a distance sufficient to permit entry therebetween of the stripper bar 78 the action of the pinion 79, through the friction facing 80, will move the stripper bar 78 into engagement with the tire in the mold cavity. The stripper bar 78, therefore, engages under the forward edge of the tire and assists the gripping action of the forward edge of the upper mold element 6 in removing the tire from the lower mold element 5. As the press elements continue to open the stripper bar 78 continues its movement under the stripped tire in the lower mold element 5 until the tire is completely stripped from the lower mold element. In the meantime the tire having been gripped by the rear edge of the lower mold section is stripped from the upper mold section at the rear of the press. As is well known, the tire usually adheres to a greater extent to the lower mold section than to the upper. The self-stripping effect secured by the lateral shifting of the mold sections during their opening movement is generally sufficient to strip the tire from the upper mold section and thus the gripping action of the lower mold section at the rear of the tire is sufficient to effect separation between the tire and the upper mold section. When, however, the stripping effect of the gripping action of the forward edge of the upper mold section on the tire is augmented by the stripper bar 78 I always insure that the tire will be stripped from the lower mold section.

The movement of the parts during the closing of the press is believed to be sufficiently self-evident from the description which has been given of their operation during the closing movement of the press.

It may be well to point out, however, that when the plates 23' move in a counterclockwise direction during closing movement of the press the cam element 41 carried thereby does not vary the position of the auxiliary side plate 23 with respect to the main side plate 17. This is due to the following fact. The cam element 41 in moving the shaft 35 and its associated auxiliary side plates to the right during the opening movement of the press causes the arm 36 to likewise move to the right. In so moving to the right the finger 38 of the arm 36 slides over the abutment 39 and is guided thereby. After the roller 37 has passed over the cam element 41, the springs 30 and 31 return the auxiliary side plate 23 to the left for a distance sufficient for the finger 38 to clear the abutment 39. Now when the cam element 41 moves in a counterclockwise direction, i. e., during closing movement of the press the arm 36 is rotated in a clockwise direction for an amount sufficient to permit the roller 37 to ride up over the cam element 41 without moving the auxiliary side plate 23 to the right. It will thus be observed that while the opening movement of the press is effected by a separating and lateral shifting movement between the mold sections, however closing movement of the press is effected by relative rectilinear movement between the mold elements, this being desirable in order that the molds in closing will not pinch the uncured article therebetween.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A vulcanizer press for pneumatic tires of the type cured on a curing bag which extends inwardly of the bead of the tire, comprising a pair of cooperating mold elements, a stripper ring separable from one of said mold elements and so formed that when positioned thereon it provides only that area of the curing chamber wall which is engaged by that portion of said curing bag which extends inwardly of the bead of the tire, and means functionally responsive to opening movement of the press for moving said stripper ring relatively to its associated mold element.

2. A vulcanizer press for pneumatic tires of the type cured on a curing bag which extends inwardly of the bead of the tire, comprising a pair of cooperating mold elements, a stripper ring separable from one of said mold elements and so formed that when positioned thereon it provides only that area of the curing chamber wall which is engaged by that portion of said curing bag which extends inwardly of the bead of the tire, means for relatively moving said mold elements apart by a lateral shifting and separating movement to compress the tire diametrically between diagonally opposite areas on the tread surface and grip the tire at such areas respectively by said respective mold elements, and means functionally responsive to opening movement of the press for moving said stripper ring relatively to its associated mold element.

3. A vulcanizer press for pneumatic tires of the type cured on a curing bag which extends inwardly of the bead of the tire, comprising a pair of cooperating mold elements, a stripper ring separable from one of said mold elements and so formed that when positioned thereon it provides only that area of the curing chamber wall which is engaged by that portion of said curing bag which extends inwardly of the bead of the tire, means for relatively moving said mold elements apart by a lateral shifting and separating movement such that the cured article in the press is gripped at opposite sides respectively by said respective mold elements, means movable with one of said mold elements for engagement with that side of the cured article facing the other mold element, and means functionally responsive to opening movement of the press for moving said stripper ring relatively to its associated mold element.

4. A vulcanizer press for pneumatic tires of the type cured on a curing bag which extends inwardly of the bead of the tire, comprising a pair of cooperating mold elements, a stripper ring separable from one of said mold elements and so formed that when positioned thereon it provides only that area of the curing chamber wall which is engaged by that portion of said curing bag which extends inwardly of the bead of the tire, means for relatively moving said mold elements apart by a lateral shifting and separating movement such that the cured article in the press is gripped at opposite sides respectively by said respective mold elements, means movable with one of said mold elements for automatic engagement, upon separation of said mold elements, with that side of the cured tire facing the other mold element, and means functionally responsive to opening movement of the press for moving said stripper ring relatively to its associated mold element.

5. A vulcanizer press for pneumatic tires of the type cured on a curing bag which extends inwardly of the bead of the tire, comprising a pair of cooperating mold elements, a stripper ring separable from one of said mold elements and so formed that when positioned thereon it provides only that area of the curing chamber wall which is engaged by that portion of said curing bag which extends inwardly of the bead of the tire, means for relatively moving said mold elements apart by a lateral shifting and separating movement such that the cured article in the press is gripped at opposite sides respectively by said respective mold elements, means movable with one of said mold elements and adapted to enter the space therebetween upon separation thereof for engagement with the cured tire to separate the same from the other mold element, and means functionally responsive to opening movement of the press for moving said stripper ring relatively to its associated mold element.

6. A vulcanizer press for pneumatic tires of the type cured on a curing bag which extends inwardly of the bead of the tire, comprising a pair of cooperating mold elements, a stripper ring separable from one of said mold elements and so formed that when positioned thereon it provides only that area of the curing chamber wall which is engaged by that portion of said curing bag which extends inwardly of the bead of the tire, means for relatively moving said mold elements apart by a lateral shifting and separating movement such that the cured article in the press is gripped at opposite sides respectively by said respective mold elements, means functionally responsive to the initial stages of opening movement of the press for moving said stripper ring off from its associated mold element, said stripper ring being returnable after such movement to its position on said mold element for the remainder of the opening movement and until the press is again reopened.

7. A vulcanizer press for pneumatic tires of the type cured on a curing bag which extends inwardly of the bead of the tire, comprising a pair of cooperating mold elements, a stripper ring separable from one of said mold elements and so formed that when positioned thereon it provides only that area of the curing chamber wall which is engaged by that portion of said curing bag which extends inwardly of the bead of the tire, means for relatively moving said mold elements apart by a lateral shifting and separating movement such that the cured article in the press is gripped at opposite sides respectively by said respective mold elements, means movable with one of said mold elements for engagement with that side of the cured article facing the other mold element, means functionally responsive to the initial stages of opening movement of the press for moving said stripper ring off from its associated mold element, said stripper ring being returnable after such movement to its position on said mold element for the remainder of the opening movement and until the press is again reopened.

8. A vulcanizer press for pneumatic tires of the type cured on a curing bag which extends inwardly of the bead of the tire, comprising a pair of cooperating mold elements, a stripper ring separable from one of said mold elements and so formed that when positioned thereon it provides only that area of the curing chamber wall which is engaged by that portion of said curing bag which extends inwardly of the bead of the tire, means for relatively moving said mold elements apart by a lateral shifting and separating movement such that the cured article in the press is gripped at opposite sides respectively by said respective mold elements, means movable with one of said mold elements for automatic engagement, upon separation of said mold elements, with that side of the cured tire facing the other mold element, means functionally responsive to the initial stages of opening movement of the press for moving said stripper ring off from its associated mold element, said stripper ring being returnable after such movement to its position on said mold element for the remainder of the opening movement and until the press is again reopened.

9. A vulcanizer press for pneumatic tires of the type cured on a curing bag which extends inwardly of the bead of the tire, comprising a pair of cooperating mold elements, a stripper ring separable from one of said mold elements and so formed that when positioned thereon it provides only that area of the curing chamber wall which is engaged by that portion of said curing bag which extends inwardly of the bead of the tire, means for relatively moving said mold elements apart by a lateral shifting and separating movement such that the cured article in the press is gripped at opposite sides respectively by said respective mold elements, means movable with one of said mold elements upon initial separation of said mold elements into engagement with the cured tire to separate the same from the other mold element, means functionally responsive to the initial stage of opening movement of the press for moving said stripper ring off from its associated mold element, said stripper ring being returnable after such movement to its position on said mold element for the remainder of the opening movement and until the press is again reopened.

10. A vulcanizer press for pneumatic tires of the type cured on a curing bag which extends inwardly of the bead of the tire, comprising a pair of cooperating mold elements, a stripper ring separable from one of said mold elements and so formed that when positioned thereon it provides only that area of the curing chamber wall which is engaged by that portion of said curing bag which extends inwardly of the bead of the tire, opening means for moving said mold elements apart effective upon operation thereof to separate the tire from both mold elements, and means functionally responsive to opening movement of the press for moving said stripper ring relative to its associated mold element.

JAMES W. BRUNDAGE.